INVENTOR.
HERMAN E. WEGNER

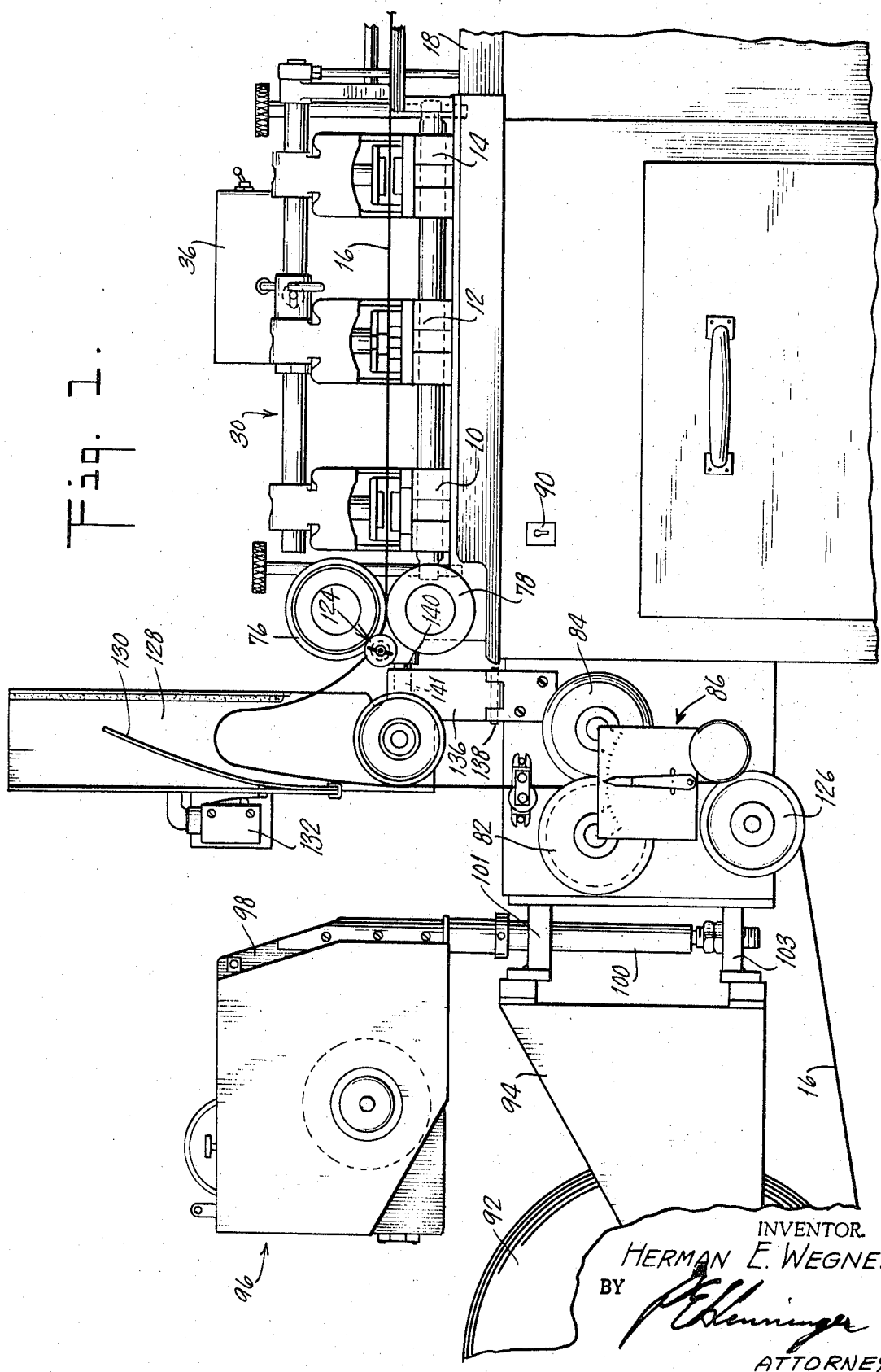

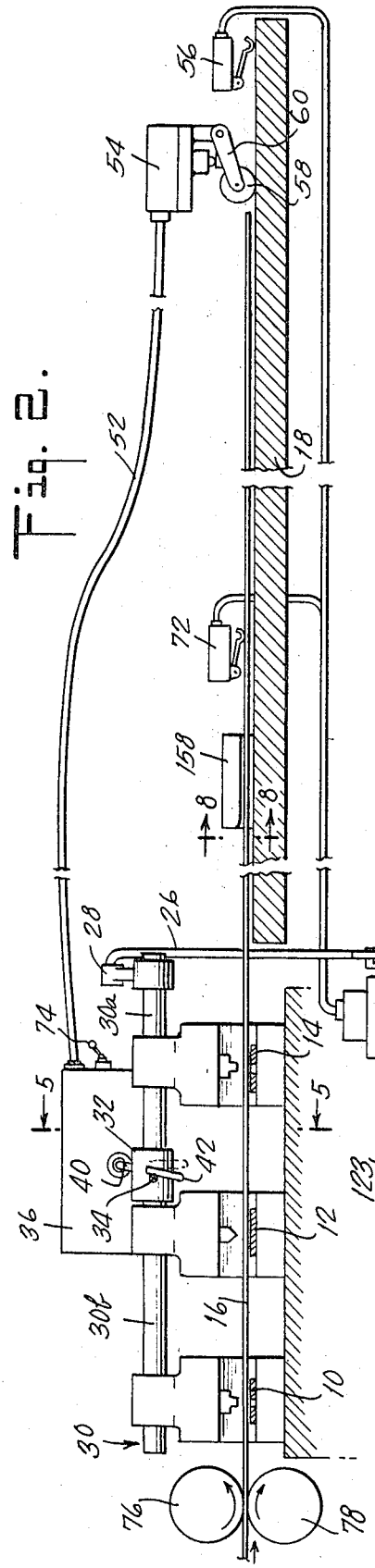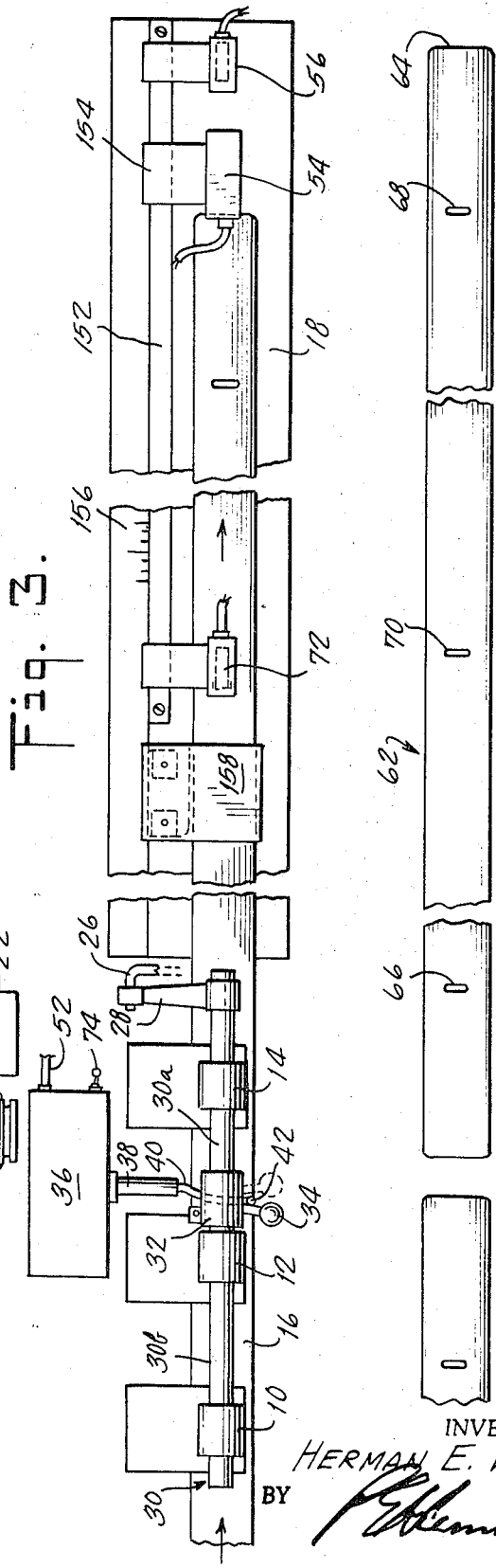

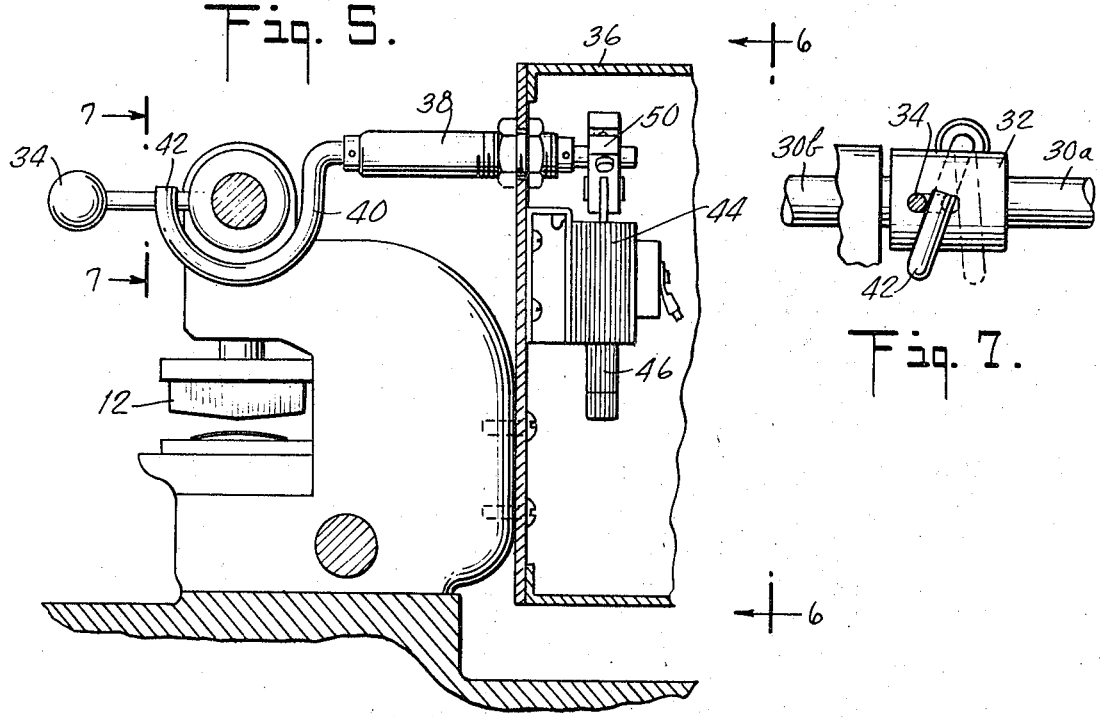
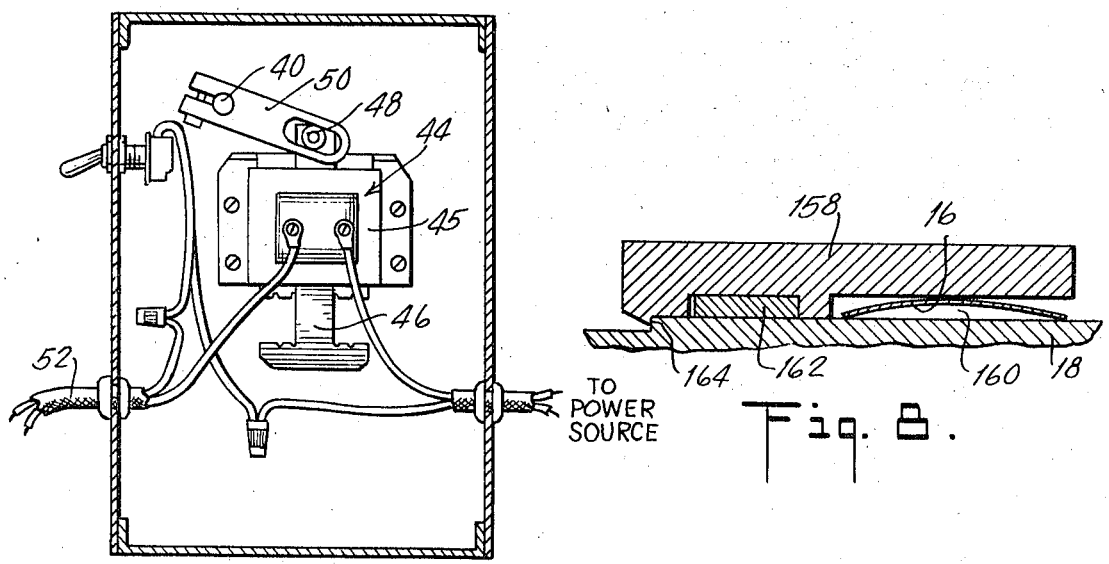

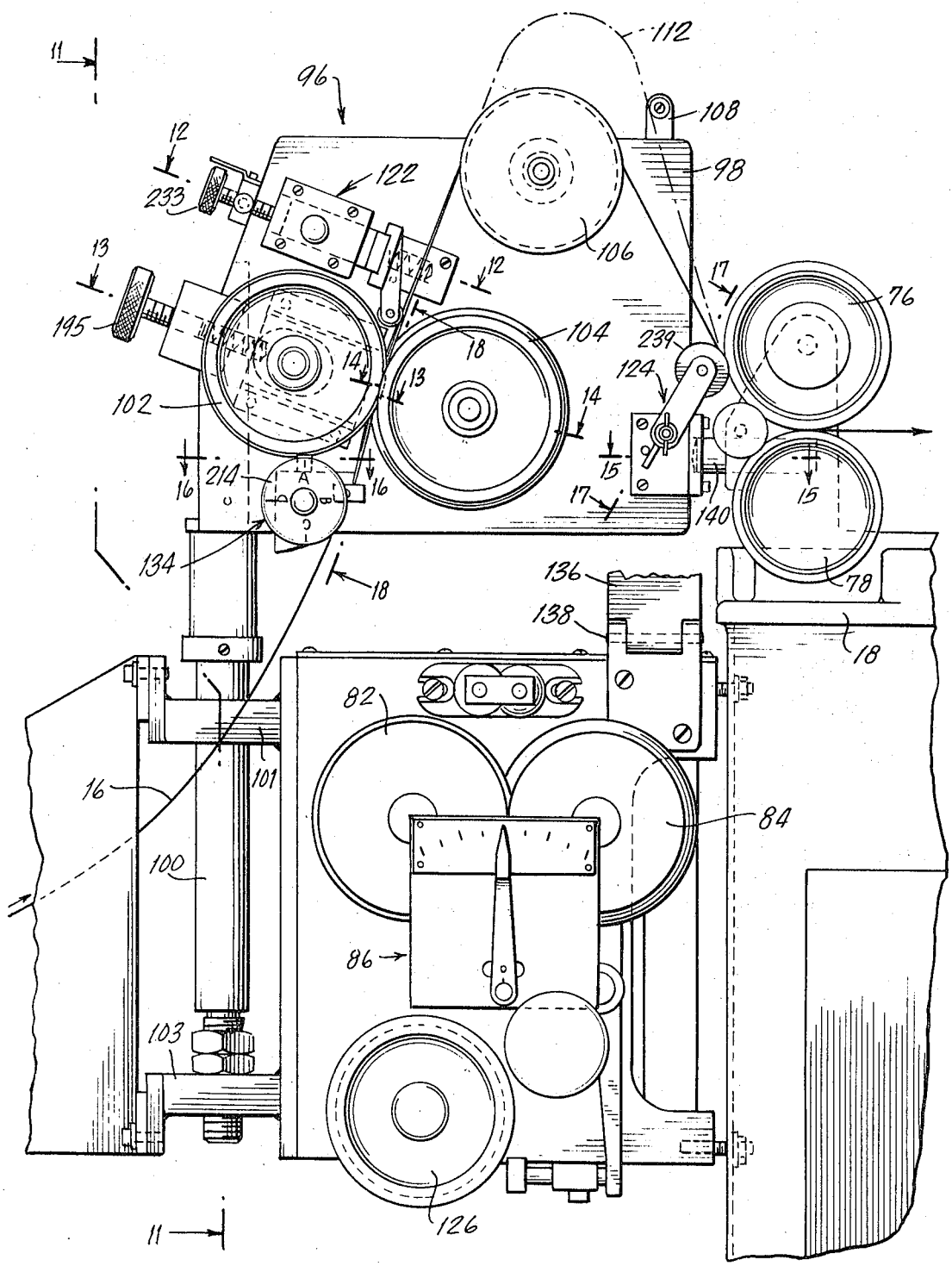

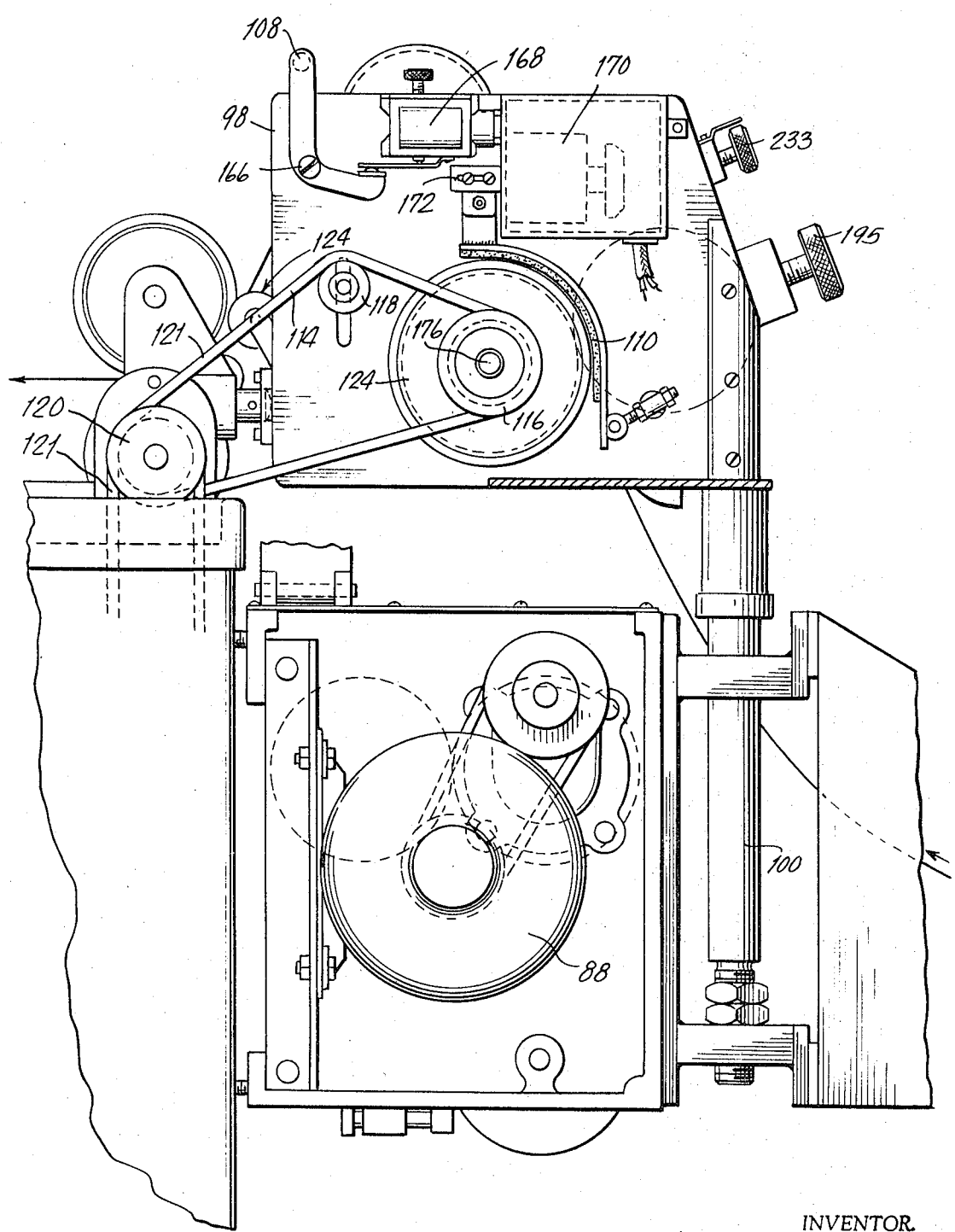

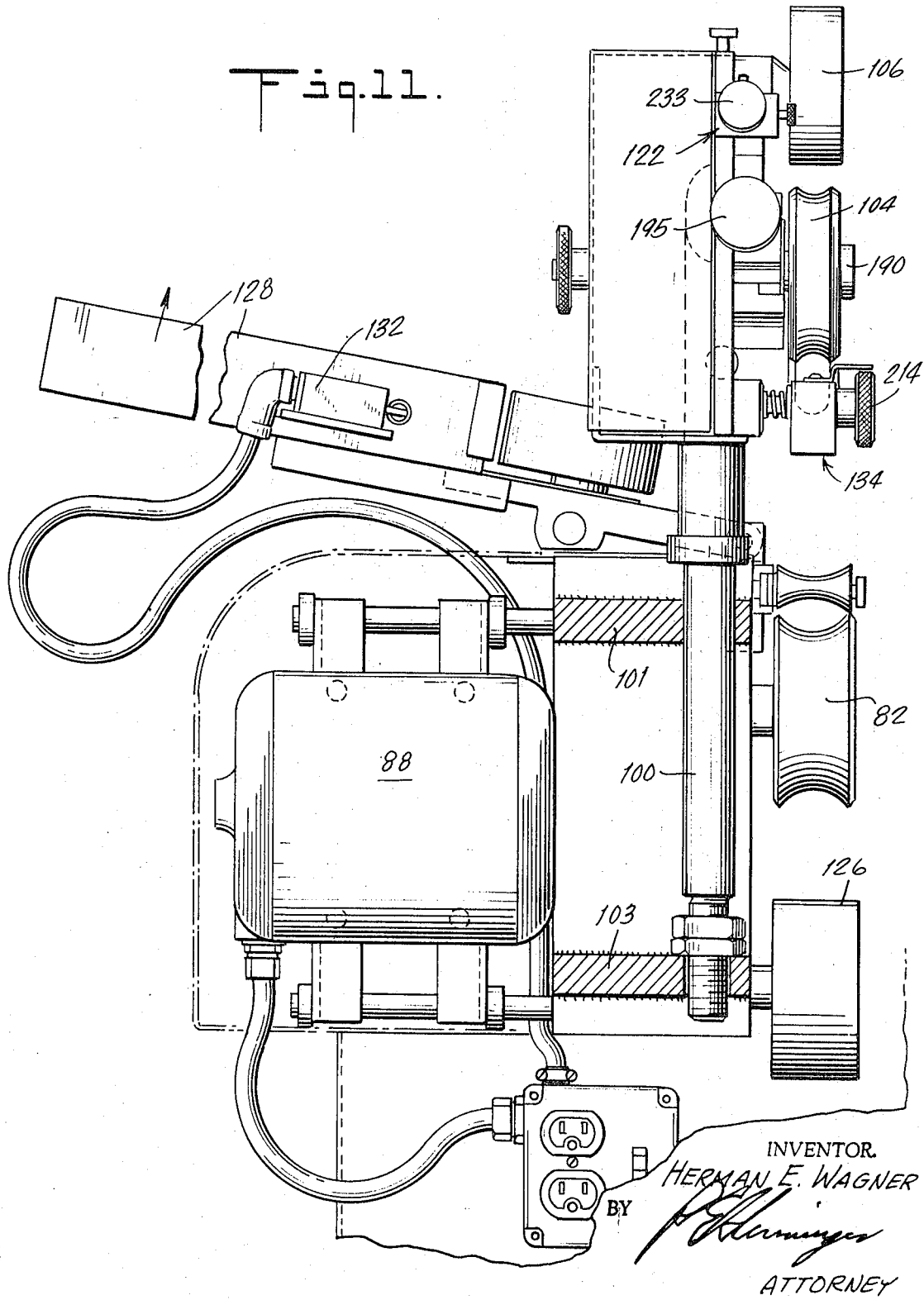

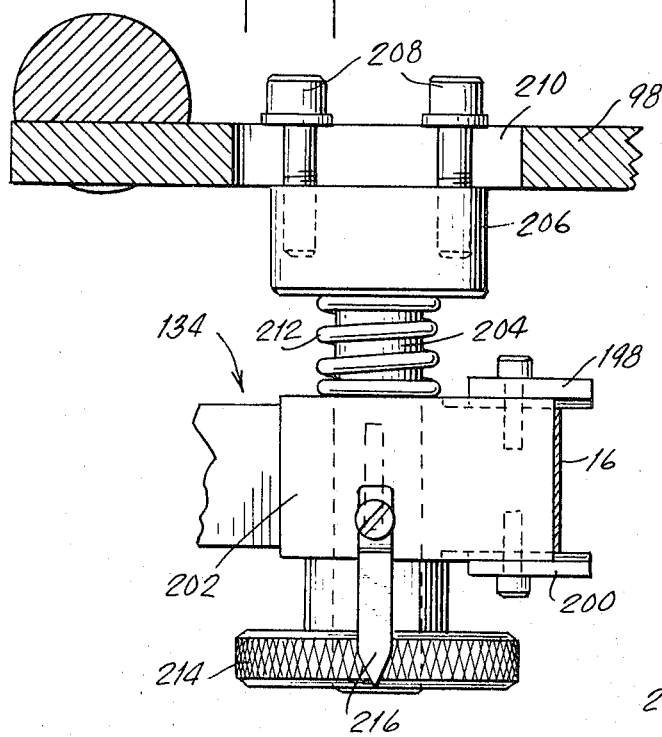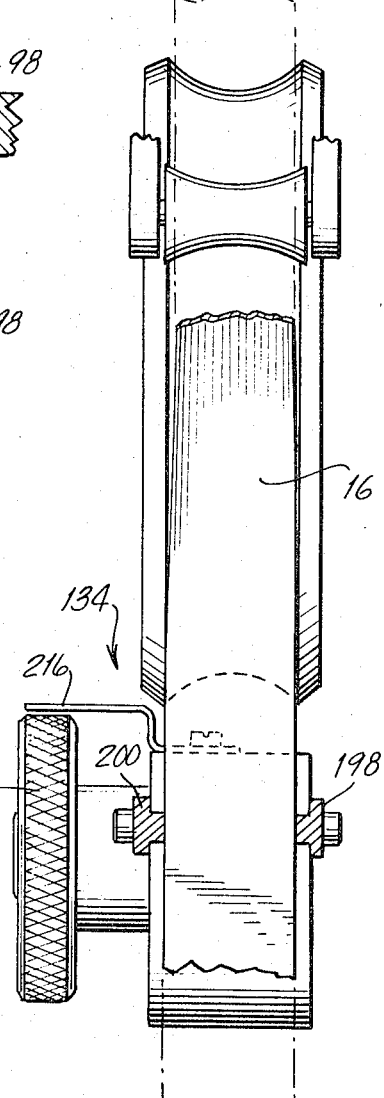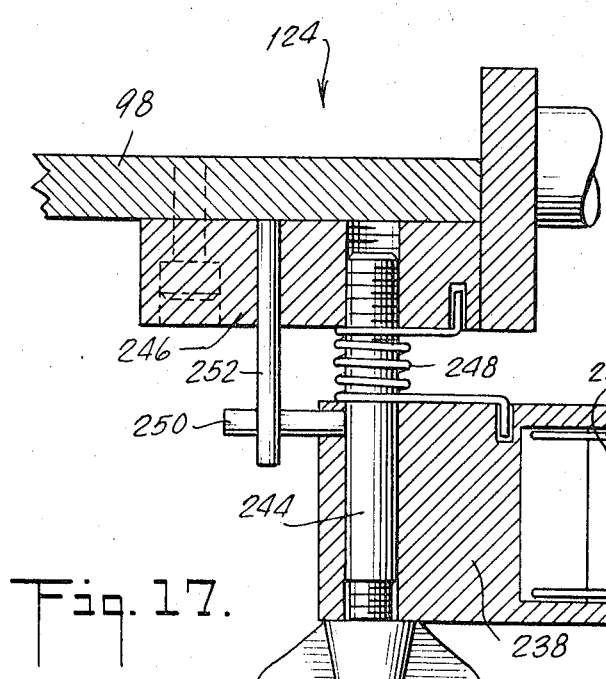

United States Patent Office 3,555,864
Patented Jan. 19, 1971

3,555,864
SLAT ACCESSORY MACHINE
Herman E. Wegner, Riverside, Calif., assignor to Alcan Aluminum Corporation, Cleveland, Ohio, a corporation of New York
Filed Sept. 27, 1968, Ser. No. 763,106
Int. Cl. B21b *37/00;* B21d *43/28;* B23p *19/04*
U.S. Cl. 72—14                                    15 Claims

ABSTRACT OF THE DISCLOSURE

A 2″ venetian blind slat machine has means for feeding a pre-crowned 2″ metal strip through a pair of feed rolls which draw the strip from a coil thereof and drive it into an accumulator loop and also, if necessary, correct its bow. The crowned strip is fed through three aligned, readily replaceable cutting dies, one of which cuts the strip into predetermined lengths, and the other two punch rout holes into the ends of adjacent slats. A pivoted adjunct containing crowning rolls for a narrower strip, e.g. a 1″ strip, for example, is mounted ahead of the cutting dies so that it can be swung into position and latched in line with the dies to crown a flat strip of the narrower width which is fed into the cutting dies, now being cutting dies adapted to the narrower strip, replacing the 2″ cutting dies.

---

The dies are operated by a split drive shaft composed of two axially aligned sections which are coupled by a clutch. The first shaft section operates a rout hole die to punch a rout hole at the trailing end of a slat. The second shaft section operates the dies to sever the slat and punch the rout hole at the leading end of a following slat. Intermediate rout holes may be punched into the slat at predetermined points by manipulating the drive shaft clutch to activate a single rout hole punch.

For the automatic control of the dies to cut slats, punch rout holes at the ends thereof, and punch intermediate rout holes, a plurality of control switches are provided along a run-out table which are operated by passage of the slat end and thereby control a drive shaft clutch control solenoid to selectively cause operation of all three dies or a single rout hole die only. A normally closed clutch control switch over the run-out table decouples the drive shaft clutch until the end of a slat opens it, thereby cutting a rout hole at the leading end of the slat. When the slat passes under the clutch control switch, the clutch control solenoid is released, and the drive shaft sections are coupled. Contact between the end of the slat and a single revolution clutch limit switch located beyond the drive shaft clutch control switch will cause simultaneous operation of the three punches. One or more rout hole switches, in control of the single revolution clutch, are mounted over the run-out table at predetermined points between the dies and the drive shaft clutch control switch. These switches provide a pulse to the single revolution clutch upon contact by the end of the slat, and the die drive shaft still being uncoupled, will operate the single rout hole die to punch intermediate rout holes.

The invention will be fully explained in the following description read in light of the drawings, in which drawings like reference numerals indicate like parts, and in which:

FIG. 1 is an elevational view of the front end of the slat cutting machine;

FIG. 2 is a somewhat diagrammatic view of the slat cutting machine showing the cutting and punching dies together with the control mechanism therefor, parts of which are disposed along the slat run-out table;

FIG. 3 is a plan view of the mechanism shown in FIG. 2;

FIG. 4 is a plan view of a first venetian blind slat having a multiplicity of rout holes and a fragment of a succeeding slat having a single rout hole;

FIG. 5 is a transverse view, partly in section, through the cut-off die and showing rock shaft clutch control mechanism;

FIG. 6 is a view taken on line 6—6 of FIG. 5, showing in elevation the rock shaft clutch control mechanism of FIG. 5;

FIG. 7 is a view on line 7—7 of FIG. 5 illustrating rock shaft clutch control mechanism;

FIG. 8 is a fragmentary cross-sectional view on line 8—8 of FIG. 2;

FIG. 9 is a plan view of strip forming and feeding mechanism at the forward end of the slat cutter;

FIG. 10 is a view similar to that of FIG. 9, taken from the opposite face of the slat cutter;

FIG. 11 is an elevational view taken on line 11—11 of FIG. 9;

FIG. 16 is a detailed view taken on line 16—16 of FIG. 9, parts being in section and parts in full line;

FIG. 17 is a detailed view taken on line 17—17 of FIG. 9, parts being shown in section and parts in full line; and FIG. 18 is a view taken on line 18—18 of FIG. 9.

Figure 12:
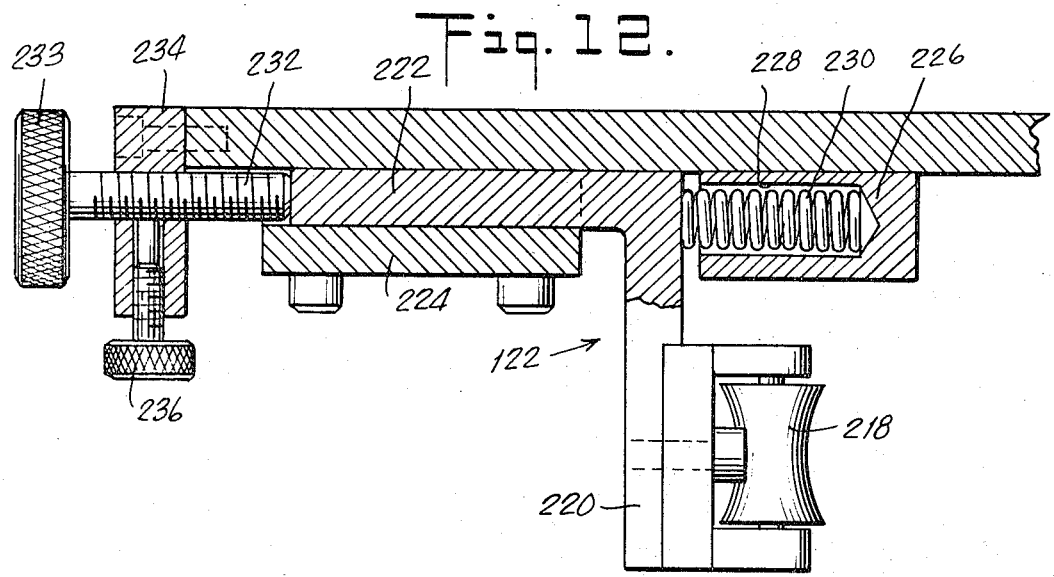
FIG. 12 is a detailed view taken on line 12—12 of FIG. 9, parts being shown in section and parts in full line.

The invention will best be understood by the preliminary presentation of a brief description of the nature and function of the slat cutting machine and by thereafter returning to a detailed description of its major elements.

Reference to FIGS. 1 and 2 will show that the machine is provided with three cutting dies 10, 12 and 14. Dies 10 and 14 are adapted to punch rout holes to accommodate the lift cords in the slat while die 12 is a cutoff die which cuts the completed slat to the desired length. The crowned slat strip 16 which is a light gage metal strip, preferably aluminum, passes through the dies in the direction shown by the arrow in FIG. 2, and runs out onto an elongated run-out table 18 where the leading edge of the slat engages and closes a microswitch which is in circuit with a clutch trip solenoid 20 which, in turn, controls a conventional single revolution clutch 22 driven by a motor 24. The clutch 22 causes a connecting rod 26 to pull down on a lever 28 fixed to one end of a rock shaft 30 which is operatively associated with the dies 10, 12 and 14 to operate the same through a cutting stroke.

The rock shaft 30 is composed of two separate axially aligned shafts 30a and 30b comprising a first section and a second section of the rock shaft which are normally connected together by a clutch 32 having an operating lever 34. The operating lever 34 is spring-loaded toward the right, as viewed in FIGS. 1 and 2, in which position the two sections 30a and 30b of the shaft are locked together to rotate as one. When the clutch operating lever 34 is moved to the left, the shaft section 30b is disconnected from section 30a, and since the lever 28 is fixed to the latter, only section 30a of the rock shaft will be oscillated. Under these conditions the rout hole die 14 only will be actuated to cut a lift cord hole into the slat. The mechanism described thus far is of conventional structure which has heretofore been manually controlled by an operator, selectively operating the rock shaft clutch 32 either to operate all three punches, or the rout hole punch 14 alone, as required for simultaneously punching rout holes at the end of a pair of slats and severing the strip, or for punching intermediate rout holes in a slat by actuation of the rout hole punch 14 alone.

The novel control for the slat cutter includes a control box 36 mounted on the machine behind the cutting dies 12 and 14. A bushing tube 38 (FIG. 3) projects forwardly from the front side of the control box 36, and journalled within the tube 38 is a control rod 40. The projecting free end 42 of the control rod 40 is bent into a U-shape (see FIG. 5), passing down under the rock shaft clutch 32 and up on the front side thereof. The end 42 of the control rod terminates a short distance below the pivot axis of the rod and lies adjacent the right edge of the clutch operating lever 34. When the control rod 40 is oscillated in a clockwise direction, its end 42 swings in an arcuate path to the left, pushing the operating lever 34 ahead of it.

The control rod 40 is oscillated by means of a solenoid 44 (FIGS. 5 and 6) mounted in the control box 36. The armature 46 of the solenoid 44 moves vertically and the upper end thereof is connected by a pin 48 to a lever arm 50 mounted on the rear end of the control rod 40. The windings 45 of the solenoid 44 are connected by wires 52 to a normally closed microswitch 54 (FIG. 2) which is mounted over the run-out table 18 just in front of and in line with a second normally open limit microswitch 56. The microswitch 56, when closed, actuates the single revolution clutch 22, thereby causing the rock shaft 30 to be oscillated.

The microswitch 54, being normally closed, energizes the solenoid 44 until opened by the end of the strip 16 passing under a roller 58 mounted at the end of a pivoted switch arm 60. Thus the solenoid 44, through the control rod 40, holds the rock shaft clutch 32 to the left, thereby disconnecting rock shaft section 30b from section 30a, enabling activation of the rout hole die 10 only until the microswitch 54 is opened.

The microswitch 54 is located over the run-out table 18 at a point just in front of the limit microswitch 56 which trips the single revolution clutch 22 for the final operation on each slat, i.e., the simultaneous operation of all three dies to form the last rout hole in the advanced slat, to cut the slat off to the desired length, and to form the first rout hole in the following slat. Thus, the solenoid 44 is de-energized just prior to the time the clutch 22 is tripped by the limit microswitch 65, and thus causes the rock shaft clutch 32 to move to the right under spring bias, thereby connecting the shaft sections 30a and 30b, and causing all three dies to operate simultaneously.

The foregoing operation will produce a venetian blind slat 62, such as shown in FIG. 4, wherein the ends 64 are cut to the desired contour and the rout holes 66 and 68 are formed adjacent the respective ends of the slat.

If intermediate rout holes, such as represented by the rout hole 70 of FIG. 4, e.g., two are to be formed in the slat, two additional microswitches similar to the limit microswitch 56 are provided on the run-out table in front of the microswitch 54. One such intermediate rout hole microswitch 72 is shown in FIGS. 2 and 3. These intermediate rout hole microswitches are successively engaged and closed by the end of the strip and cause the single revolution clutch 22 to be tripped. However, since these intermediate rout hole microswitches are in front of the microswitch 54, the solenoid 44 remains energized, and when the clutch 22 is tripped, the clutch operating lever 34 is held over to the left so that only the rout hole die 14 is actuated to cut a cord hole in the slat at that selected position or positions. It should be noted that the intermediate cord hole microswitches are actuated by the impact imparted by the end of the moving slat strip and that the initial force of the impact momentarily closes the switch to provide an operating pulse to the clutch solenoid 20. Mere contact between the intermediate cord hole microswitches and the moving strip permits these switches to remain open.

When the machine is to be used for making slats with only two cord holes, the microswitch 54 is removed from the run-out table and a switch 74 extending from the side of the control box 36 is opened; this de-energizes the solenoid 44 and permits release of the clutch rod 40. The spring biased clutch operating lever 34 is thereupon returned to the right, as viewed in FIGS. 2 and 3, which will cause the three dies 10, 12 and 14 to operate each time the single revolution clutch 22 is tripped.

Venetian blind slats commonly in use today are about 2" in width. The conventional blind slat cutting machine is adapted to produce blind slats of the latter width. Currently much narrower blind slats, e.g. 1" in width, are ascending to popularity. These latter slats cannot be cut on a slat cutting machine of conventional structure and if slats of different widths, e.g. 1" and 2" slats, are to be produced, it has heretofore been necessary to provide separate slat cutting machines for the purpose. As heretofore stated, one of the important objects of this invention is to provide an accessory for a conventional slat cutting machine which will permit the same machine to produce slats of different widths.

The accessory in question is a unit 96 (FIG. 1 and FIG. 9) which is mounted at the left end of the slat cutting machine to convert the latter from a 2" strip cutter to a 1" strip cutter, or vice versa. This accessory is best illustrated in FIGS. 1, 9 and 10. In FIG. 1, the accessory is shown in inoperative position, i.e., the position assumed by it while the machine is used for cutting wide slats, while in FIGS. 9 and 10 the accessory is disclosed in its operative position which it assumes for cutting 1" slats, for example. The 2" slat cutting machine includes a pair of power driven feed rolls 76 and 78 with a guide roller followed by the three cutting dies 10, 12 and 14 and the accessories thereto, as previously explained.

Mounted at the left end of the run-out table are a pair of drive rolls 82 and 84 (FIG. 1) a bow control 86, and a guide roller 126 for the 2" wide strip. This mechanism is driven by an electric motor 88 (FIG. 10) which is controlled by a switch 90 at the front of the run-out table (FIG. 1). A coil 92 of pre-crowned 2" metal strip, preferably aluminum which feeds the machine is mounted in a support cradle 94 (FIG. 1) at the extreme left end of the machine. The mechanism immediately above described is conventional and forms no part of the invention aside from any parts thereof co-acting with the 1" strip accessory generally indicated in FIG. 1 by the reference numeral 96.

The wider strip, such as a 2" strip of aluminum, is so thin and high in strength that it cannot be crowned with a single pair of rollers due to the extreme amount of "spring back." The wider strip is crowned, i.e. transversely bowed, on the coating lines, immediately before coiling, through a 2-strand form and bow control combination. The strip so crowned is very stable. A pre-crowned narrow strip, e.g. a 1" strip, for example, fails to remain stable in the coil. A high percentage changes from straight to back bow so severely that it cannot be corrected in the slat cutting machine, even when equipped with a special narrow strip bow correction device. The narrow strip adjunct herein operates with great satisfaction from flat narrow strip and avoids the previous problems of crowning the strip after coating and before coiling. Also, as stated, the machine has the great advantage of quick change and automatic rout control.

The acccessory 96 includes a back plate 98 which is supported at one end for horizontal swinging movement on a pivot post 100 which passes through a pair of bearing brackets 101 and 103 extending from the front of the machine frame. Mounted on the front side of the back plate 98 (FIG. 9) is a pair of crowning rolls 102 and 104 by which a transverse curvature is imparted to the flat strip, and an eccentrically mounted idler wheel 106. Above and to the right of the idler wheel 106 is a feeler arm 108 which is engaged by a strip when an accumulated strip loop 112, as shown by the dotted line in FIG. 9, reaches a predetermined height, causing the feeler arm 108 to close a switch that causes a brake 110 (FIG. 10) to stop the roll. This stops the drive of the slat strip until the accumulated loop 112 has been partially used, at which point the feeler arm 108 is disengaged by the strip causing release of the brake. The clutch 178 is a disk type, spring-loaded friction clutch, adjusted so that it will drive the roll but will slip and stall when the brake is applied.

The crowning rolls 102 and 104 are driven by a belt 114 (FIG. 10). The belt is trained about a drive pulley 116 at the back of the plate 98, around an idler 118, and around a double V-belt pulley 120 on the shaft of the lower feed roll 78. The pulley 120 is driven by means of a belt 121 trained about a pulley 123 (FIG. 2) driven by the single revolution clutch motor 24. A bow control 122 (FIG. 9) enables the operator to keep the crowned strip straight and to correct for bow.

The dies 10, 12, and 14 have snap-in cutters, which can be removed and replaced with similar cutters for the particular strip width. If the machine is conditioned to handle a 2" strip, the unit 96 will be swung out of the way. The strip from the coil 92, in the supporting cradle 94 (FIG. 1) in such case, is trained about a roller 126, through the bow control unit 86, through the drive rolls 82 and 84, up through a strip accumulator 128 where over accumulation will operate the operating finger 130 of a drive control switch 132 if the loop within the accumulator 128 becomes too large.

From this point, the strip is taken through the guide roller 80, the feed rollers 76 and 78, the cutting dies 10, 12, and 14, and onto the run-out table 18.

To adapt the machine to cut a narrow strip, e.g. a 1" strip, for example, the coil 92 is replaced with a coil of flat strip of the desired width, the unit 96 is swung into the operative position shown in FIG. 9, and the driving belt 114 is trained about the pulley 116 and about the pulley 120 which latter drives the lower feed roll 78, as stated. The cutters of the dies 10, 12, and 14 are snapped out, and replaced with strip cutters adapted to the width of the narrower strip. The narrower strip is now trained past a twist control unit 134 (FIG. 9), between the crowning rolls 102 and 104, past a bow control unit 122, over the idler wheel 106, past the feeler arm 108, through a strip guide unit 124, through the feed rolls 76 and 78, through the cutting dies 10, 12 and 14, and onto the run-out table 18.

Somewhat more specific attention to the details shown in the drawings will disclose that the strip accumulator 128 (FIG. 1) is mounted to swing in a vertical plane from the position shown in FIG. 1 to that shown in FIG. 11. The mounting structure comprises a hinge-like element 136 which swings about a horizontal pintle 138.

Both the strip accumulator 128 and the strip accessory 96 are held in operative position by a pin 140 carried by the run-out table frame and having a projecting end adapted to enter a socket formed both in the face of the strip accumulator 128 and in the strip accessory 96.

Figure 15:
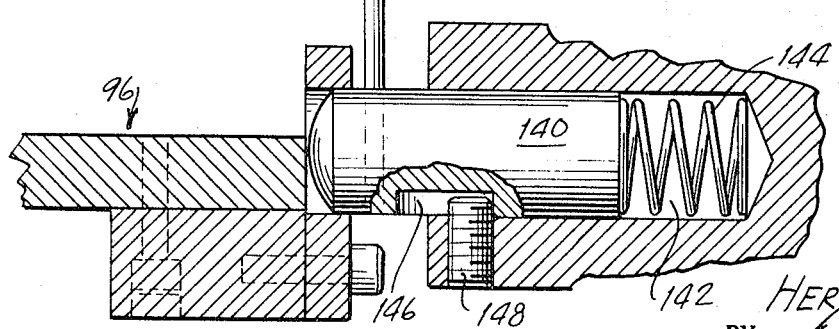
FIG. 15 is a detailed view taken on line 15—15 of FIG. 9, parts being shown in section and parts in full line.

The specific arrangement of the locating pin 140 can be ascertained by reference to FIG. 15, wherein it is seen that the pin 140 is seated in a cavity 142 formed in the run-out table frame. The pin 140 is spring-pressed outwardly by a coil spring 144 seated between the inner end of the pin and the base of the cavity. An axial groove 146 is formed in one face of the pin 140 to receive the end of a set screw 148 whose inner end extends into the cavity and into the axial groove 146. The set screw 148 limits the outward movement of the pin 140. Attached to the pin 140 is an operating lever 150 by which the pin may be manually pressed back into the cavity 142 to release either the strip accumulator 128, or the strip accessory 96, as the case may be, or upon engaging either of them. It is seen, therefore, that the pin 140 serves not only to locate and latch the accessory 96, but also to locate and latch the loop accumulator 128 which has a facial socket 141 in which the pin is received.

The several microswitches 54, 56, 72 and others which may be employed, are slidably mounted (FIG. 3) on a mounting rod 152 attached in an elevated position to the face of the run-out table. Each of the switches is provided with an attaching sleeve 154 to which the switches are fixed and which embrace the mounting rod 152, so that the location of the switches may be readily adjusted by sliding the same along the mounting rod 152. Preferably the face of the run-out table is scaled as indicated at 156, so that the switches may be accurately located to produce venetian blind slats of predetermined length having rout holes at predetermined locations.

It is preferable to guide the strip material along the face of the run-out table. To this end, one or more strip guides 158 (FIGS. 2, 3 and 8) are provided. As shown more particularly in FIG. 8, the strip guide comprises a block having an undercut area 160, open along its front edge, which as adapted to receive and guide a strip 16 in its passage along the run-out table. Along the rear edge of the strip guide 158 are inset magnets 162 which serve to hold the strip guide in position on the metallic run-out table. The table 18 has a shoulder 164 running along its length with which a mating shoulder on the strip guide is adapted to engage thus fixing and stabilizing the lateral position of the strip guide in relation to the face of the table.

Figure 14:
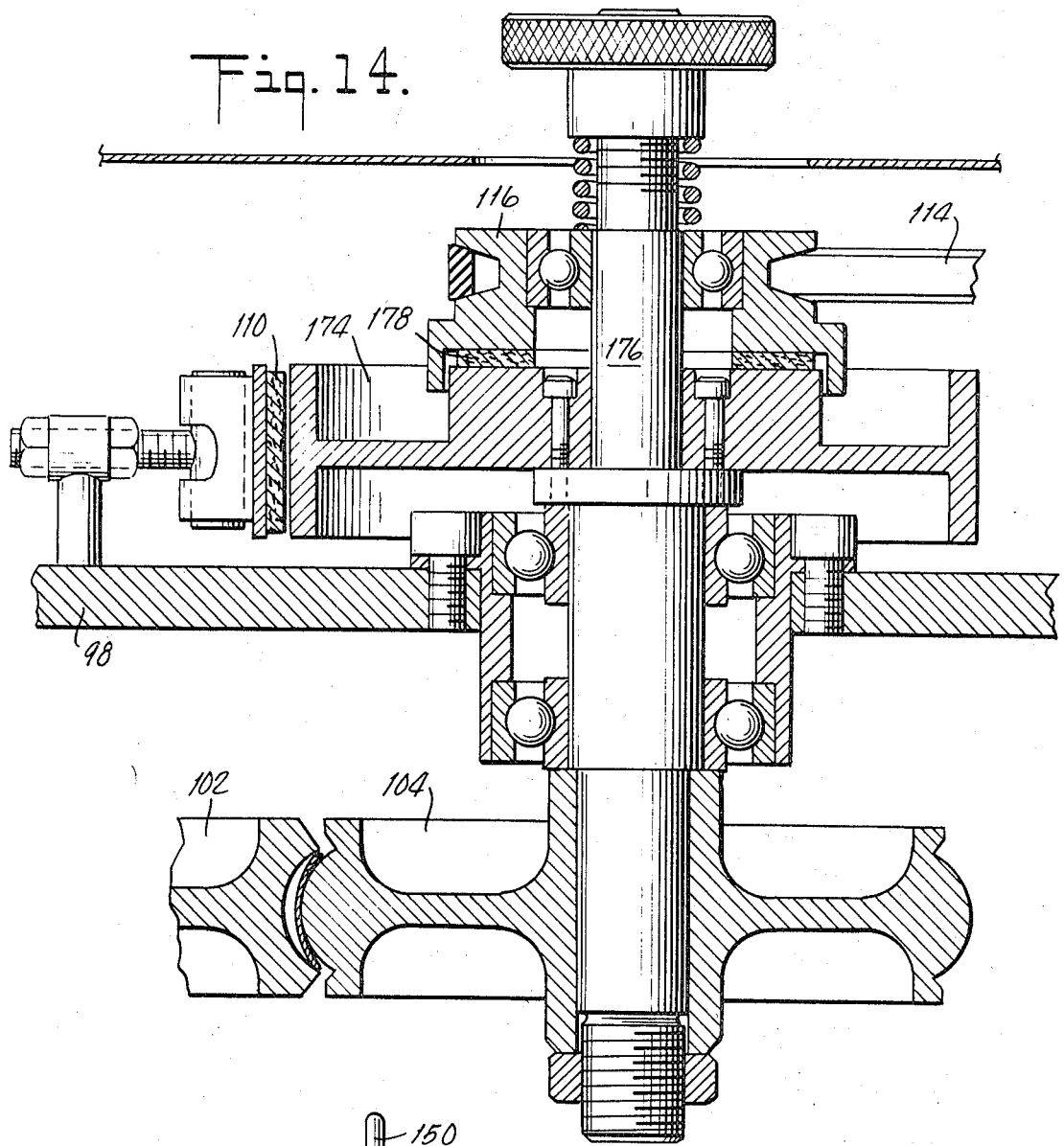
FIG. 14 is a detailed view taken on line 14—14 of FIG. 9, parts being shown in section and parts in full line.

The control of the accumulated strip loop 112 (FIG. 9) has been briefly referred to but should be examined somewhat more closely in relation to the illustration of FIGS. 10 and 14. FIG. 10 is taken from the rear face of the back plate 98 opposite to that shown in FIG. 9. Here it will be seen that the feeler arm 108 is pivoted on a mounting stud 166 about which it is normally biased in a clockwise direction. When the strip loop 112 enlarges to the point where the feeler arm 108 is engaged by it, the feeler arm lever 108 will be rocked about its pivot mounting 116 and thereby close a microswitch 168. When this microswitch is closed, it establishes a circuit to a solenoid 170 which projects its armature 172 to tighten the brake band 110 against the surface of a brake drum 174 which is fixed to the shaft 176 through which the crowning roll 104 is driven.

The drive is from the drive belt 114, the V-drive pulley 116, and by way of the spring-loaded clutch 178 to the brake drum 174 and hence through the shaft 176 to the crowning roll 104. The clutch element 178 is shown in FIG. 14 as a spring-loaded friction clutch, as stated, so adjusted that it will drive the roll but will slip when the brake is applied.

Figure 13:
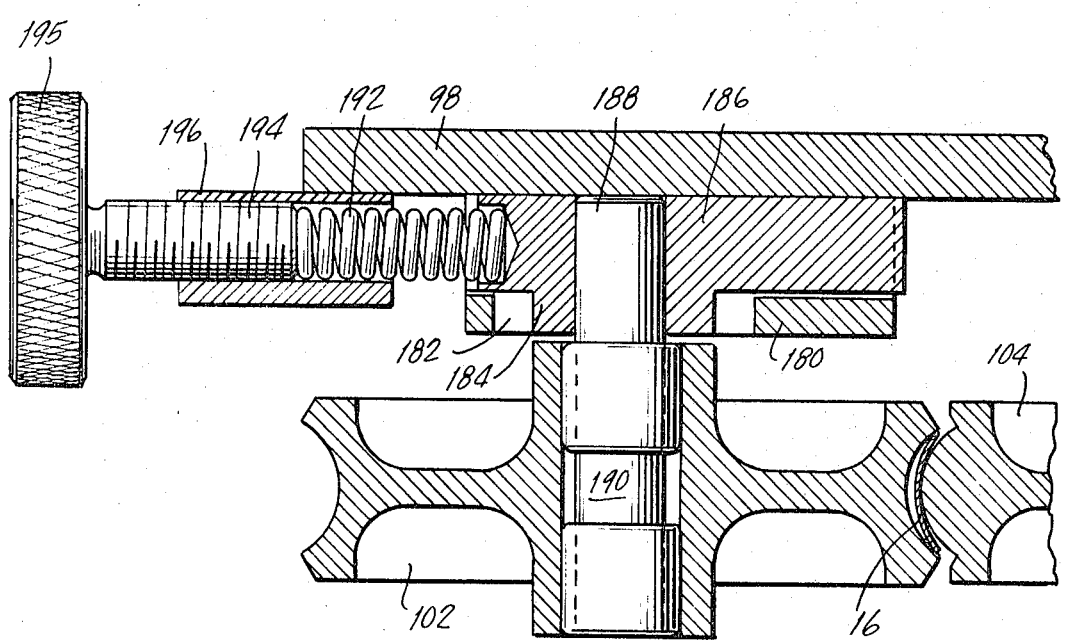
FIG. 13 is a detailed view taken on line 13—13 of FIG. 9, parts being shown in section and parts in full line.

It is intended that the crowning rolls 102 and 104 be adjustable in respect to each other. To this end, the crowning roll 102 is mounted for movement to and away from the crowning roll 104, as best illustrated in FIG. 13. A guide bearing 180 is fixed to the back plate 98 and provides a sleeve-like receptacle having an open slot 182 in its front face through which the neck is free to move for a limited distance. The bearing block 186 receives the end 188 of the crowning roll shaft 190.

The crowning roll 102 is urged toward the crowning roll 104 under pressure of a spring 192 which engages one face of the bearing block and the inner end of an adjusting screw 194 having a head 195 seated in an internally threaded sleeve 196 which is affixed to the back plate 98. Thus, if it is desired to have the crowning roll 102 engage the strip 16 under more or less pressure as it passes between the crowning rolls 102 and 104, it is merely necessary to adjust the adjusting screw 194. By such adjustment, it is possible to vary the transverse curvature of the strip 16, as may be optimum.

As the strip 16 approaches the crowning rolls 102 and 104, it passes through the twist control unit 134 (FIGS. 9, 16 and 18). Unless the strip is properly controlled as it passes into the crowning rolls 102 and 104, it may develop a twist about its longitudinal axis. Twisting is caused by an unsymmetrical entry into and passage of the strip through the crowning rolls. This condition is avoided by guiding the strip into the crowning rolls so that the strip is centrally located therein in reference to the crowning surfaces of the rolls. The twist control unit 134 fulfills this function. By reference to FIGS. 16 and 18, it will be seen that the twist control unit 134 is essentially an adjustable guide which snugly embraces the edges of the strip to guide its entrance between the crowning rolls. The guide consists of guide flanges 198 and 200 extending outwardly from a carrier body 202 which is mounted for movement along a stub shaft 204 fixed to the back plate 98. The stub shaft 204 terminates at its inner end in a block 206 which is tapped to receive a pair of machine screws 208 which extend through a slot 210 in the back plate 98. By backing off the machine screws 208, the entire twist control unit can be bodily adjusted in a horizontal direction. The carrier body 202 is biased forwardly, i.e. away from the back plate 98 by a spring 212 seated between the carrier body 202 and the block 206 of the stub shaft. An adjusting nut 214 is screwed to the forward end of the stub shaft 204 and confines the carrier body 202 on the shaft.

Manipulation of the adjusting nut 214 effectively moves the carrier body 202 and its strip guide flanges along the length of the stub shaft 204 whereby the position of the strip 16 in reference to the crowning rolls 102 and 104 can be accurately determined. A pointer 216 is carried by the top of the carrier body 202 and operates in conjunction with calibrations on the face of the adjusting nut to facilitate the achievement and maintenance of the proper lateral position of the carrier body 202.

When a flat metal strip, such as an aluminum strip, is formed between the crowning rolls, such as the rolls 102 and 104, to impart a transverse curvature to the strip, stresses are set up within the strip which may result in what is known in the industry as "back bowed" or "down bowed"; that is to say, when the edges of the strip are held downwardly, and the strip curves downwardly, it is said to be down bowed; if, however, it has a tendency to curve upwardly along its length, it is said to be back bowed.

Bowing of the crowned strip is avoided by the bow control unit 122 (FIGS. 9 and 12). Ideally, the point of contact along the length of strip being processed between the twist control unit 134, the crowning roles 102 and 104 and the bow control unit 122 are in alignment. The bow control unit 122, as better shown in FIG. 12, consists of a concave roller 218 mounted on the foot 220 of an L-shaped carrier having a leg 222 extending outwardly at right angles to the foot. The leg 222 extends into a slideway formed between the back plate 98 and a guide plate 224 fixed to the back plate 98 in spaced relation thereto, so as to form between the two a guide passage for the leg 222. A spring holder 226 is attached to the back plate 98 directly below the foot 220. The spring holder 226 has a cavity 228 into which is placed a coil spring 230 which extends somewhat beyond the mouth of the cavity and abuts the foot 220. The position of the concave roller 218, in respect to the strip path beyond the crowning rolls 102 and 104, can be regulated by means of an adjusting screw 232 which is threaded through a plate 234 attached to the top edge of the back plate 98 and which has a head 233. When the proper adjustment of the bow control unit has been attained by manipulating the adjusting screw 232 to move the roller 218 either inwardly against tension of the spring 230 or permit it to move outwardly under pressure of the spring, such adjustment can be fixed by tightening the set screw 236. When the bow control unit has been properly adjusted, the strip which has been processed through the crowning rolls will show no tendency to bow either upwardly or downwardly providing strip properties or gage does not vary significantly.

In order to provide further adjustment along the path of the strip being processed, the idler wheel 106 is eccentrically mounted making it possible to shift the initial point of contact between the wheel and the strip in a horizontal direction. Ideally, the point of contact between the strip, the twist control unit 134, the crowning rolls 102 and 104, the bow control unit 122, and the idler wheel 106 define a straight line.

As the crowned strip 16 is fed into the upper and lower feed rolls 76 and 78 (FIG. 9), it should be centered in respect to them. This function is performed by the strip guide unit 124 which is shown in detail in FIG. 17. In this figure, it is seen that the unit 124 is composed of a supporting block 238 in which is mounted a guide roller 239 for free rotation therein. The roller 239 has a pair of end flanges 240 and 242 which are spaced apart not substantially more than the width of the upper feed roller 76, the opposite faces of which are embraced by the flanges 240 and 242. This relationship insures that the bowed strip 16 will be centered in respect to the feed rollers.

The supporting block 238 is supported on a stud shaft 244 which is screw threaded into a supporting block 246 attached to the face of the back plate 98. The strip guide roller is biased in a clockwise direction into its proper relation to the upper feed roller 76 by means of a spring 248 which is coiled about the stub shaft 244 between the supporting block 238 of the roller assembly and the supporting block 246 fixed to the back plate 98. One end of the spring is anchored in the roller supporting block 238 and the other is anchored in the supporting block 246 of the back plate. The rotation of the supporting block 238 under the influence of the spring 248 is limited by contact between a pin 250 extending outwardly from the supporting block 238 and a pin 252 extending outwardly from the block 246 in intersecting position with the former pin.

The position of the block 238 and consequently that of the strip guide roller 124 axially along the stub shaft 244 can be changed by manipulating a wing nut 254 threaded to the free end of the stub shaft 244. The spring 248 will normally also bias the block 238 toward the end of the stub shaft 244. By adjusting the position of the wing nut 254, it is possible to establish an optimum relationship between the roller flanges 240 and 242 and the respective opposite faces of the feed roller 76.

While the novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. In a machine for cutting and punching venetian blind slats, a pair of rout hole punching dies and an intermediate slat severing die, said dies being adapted for cutting venetian blind slats of a first width and being readily removable from said machine and replaceable with dies for cutting and punching slats of a second width, means in said machine for feeding pre-crowned strip of a first width of metal strip into said machine, feed rollers associated with said dies for feeding crowned strip thereto, drive means for said feed rollers, a strip crowning adjunct associated with said latter feed rollers for processing flat strip of a second narrower width, said adjunct having therein strip crowning means adapted to impart a crown to a metal strip of said second narrower width, mounting means for said adjunct adapting the latter for alignment with said dies, means for latching said adjunct in alignment with said feed rollers, means for operating said strip crowning means in said adjunct, a strip loop accumulating chamber located in front of and adjacent said feed rollers, said loop accumulating chamber being mounted for movement in vertical plane to a position adjacent to and away from said feed rollers, and said adjunct being mounted for movement in a horizontal plane to a position adjacent to and away from said feed rollers.

2. The machine according to claim 1, in which said loop chamber has a socket adapted to receive a spring-pressed pin carried by said machine for latching said chamber in position adjacent said feed rollers.

3. The machine according to claim 1, in which said adjunct has a socket adapted to receive a spring-pressed pin carried by said machine for latching said adjunct in position adjacent said feed rollers.

4. The machine according to claim 1, in which said loop chamber and said adjunct each has a socket in a face thereof and each socket is adapted to receive in common a spring-pressed pin carried by said machine for alternately latching said chamber and said adjunct adjacent said feed rolls.

5. In a venetian blind slat forming machine, first and second aligned rout hole punching dies and an intermediate slat severing die, means for feeding metal strip through said dies, a one revolution clutch for periodically operating said dies, means for normally disabling said first rout hole die and said slat severing die, first strip response means connected with said die disabling means for conditioning said dies for operation, second strip responsive means between said dies and said die conditioning means in the path of said strip for causing operation of said second rout hole die while said first rout hole die and said strip severing die are disabled, and means beyond said first strip responsive means for energizing said power means whereby said three dies are operated simultaneously.

6. The arrangement of claim 5, in which said one revolution clutch is under control of a solenoid.

7. The arrangement of claim 6, in which said solenoid is energized by said second strip responsive means and by said strip responsive means beyond said first strip responsive means.

8. The arrangement of claim 6, in which said strip responsive means comprises microswitches spaced in the path of said strip along a run-out table, and each switch is connected to said solenoid.

9. The arrangement of claim 5, in which said means for normally disabling said first rout hole die and said slat severing die comprises a clutch device under control of a solenoid.

10. The arrangement of claim 9, in which said solenoid is under control of said first strip responsive means, and said first strip responsive means is a microswitch in the path of said strip.

11. The machine of claim 5, in which said first strip responsive means is a microswitch in the path of said strip.

12. The machine of claim 5, in which said second strip responsive means consists of a plurality of spaced electrical control devices in the path of said strip.

13. The arrangement of claim 12, in which said electrical control devices each is connected to said power means for energizing the latter when the electrical control devices are successively contacted by the end of said strip.

14. The machine of claim 5, in which said strip responsive means beyond said first strip responsive means is a microswitch.

15. The arrangement according to claim 14, in which said microswitch is in control of said power means and is adapted to actuate the latter when said microswitch is contacted by the end of a strip.

References Cited

UNITED STATES PATENTS

| | | | |
|---|---|---|---|
| 3,298,215 | 11/1963 | Bonhoff | 72—338 |
| 2,792,049 | 7/1952 | Peebles | 72—132 |
| 2,262,550 | 11/1941 | Hunter | 72—132 |
| 3,281,914 | 11/1966 | Hunter | 29—24.5 |

RICHARD L. HERBST, Primary Examiner

R. M. ROGERS, Assistant Examiner

U.S. Cl. X.R.

72—132, 324; 29—24.5.

7343-PEH

UNITED STATES PATENT OFFICE
CERTIFICATE OF CORRECTION

Patent No. 3,555,864            Dated January 19, 1971

Inventor(s) HERMAN E. WEGNER

It is certified that error appears in the above-identified patent and that said Letters Patent are hereby corrected as shown below:

Col. 3, line 46, for "56" read --65--

Col. 6, line 54, for "inrespect" read --in respect--

Signed and sealed this 25th day of May 1971.

(SEAL)
Attest:

EDWARD M. FLETCHER, JR.            WILLIAM E. SCHUYLER, JR
Attesting Officer                     Commissioner of Patents